United States Patent [19]

Taguchi

[11] Patent Number: 5,475,499
[45] Date of Patent: Dec. 12, 1995

[54] RECORDING/REPRODUCING APPARATUS WHERE THE VIDEO SIGNAL INDICATES THE LOCATION OF A RANDOMLY RECORDED CORRESPONDENCE AUDIO SIGNAL

[75] Inventor: Tomishige Taguchi, Urawa, Japan

[73] Assignee: Canon Kabushiki Kaisha, Tokyo, Japan

[21] Appl. No.: 407,044

[22] Filed: Mar. 17, 1995

Related U.S. Application Data

[63] Continuation of Ser. No. 136,407, Oct. 15, 1993, abandoned, which is a continuation of Ser. No. 631,187, Dec. 20, 1990, abandoned, which is a continuation of Ser. No. 282,905, Dec. 12, 1988, abandoned, which is a continuation of Ser. No. 836,633, Mar. 5, 1986, abandoned.

[30] Foreign Application Priority Data

Mar. 8, 1985 [JP] Japan .................................... 60-044749

[51] Int. Cl.⁶ ........................................................ H04N 5/76
[52] U.S. Cl. ............................................ 358/341; 360/19.1
[58] Field of Search ....................................... 358/341, 343, 358/342; 360/9.1, 19.1, 20, 61, 72.2, 35.1; 369/32, 47–50

[56] References Cited

U.S. PATENT DOCUMENTS

| | | | |
|---|---|---|---|
| 3,789,137 | 1/1974 | Newell | 358/343 |
| 3,829,610 | 8/1974 | Meeussen et al. | 369/61 VR |
| 4,303,950 | 12/1981 | Tamiguchi et al. | 360/19.1 |
| 4,446,488 | 5/1984 | Suzuki | 358/343 |
| 4,575,772 | 3/1986 | Shimoda | 358/343 |
| 4,583,132 | 4/1986 | Nakano | 358/343 |
| 4,630,134 | 12/1986 | Kanamoru | 360/19.1 |
| 4,638,376 | 1/1987 | Sugiyama et al. | 358/342 |
| 4,641,203 | 2/1987 | Miller | 358/335 |
| 4,703,369 | 10/1987 | Monyama et al. | 360/19.1 X |

FOREIGN PATENT DOCUMENTS

2111292  6/1983  United Kingdom .................. 358/342

*Primary Examiner*—W. R. Young
*Attorney, Agent, or Firm*—Fitzpatrick, Cella, Harper & Scinto

[57] ABSTRACT

This specification discloses a recording and/or reproducing apparatus for recording an audio signal and a video signal corresponding to the audio signal on a recording medium simultaneously and/or reproducing the audio signal and the video signal from the recording medium simultaneously. The apparatus records the video signal with a signal indicative of the recorded area of the corresponding audio signal.

4 Claims, 8 Drawing Sheets

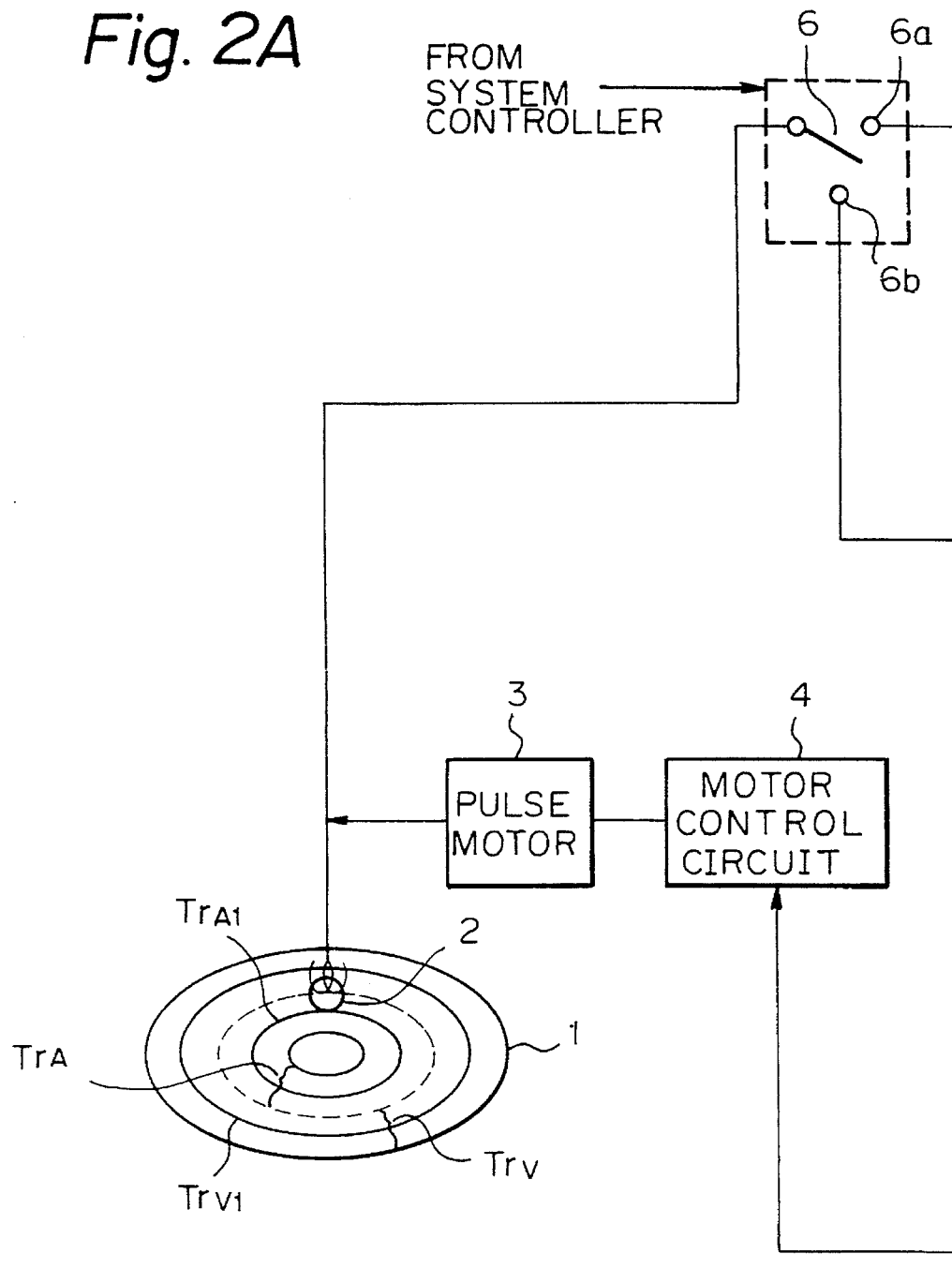

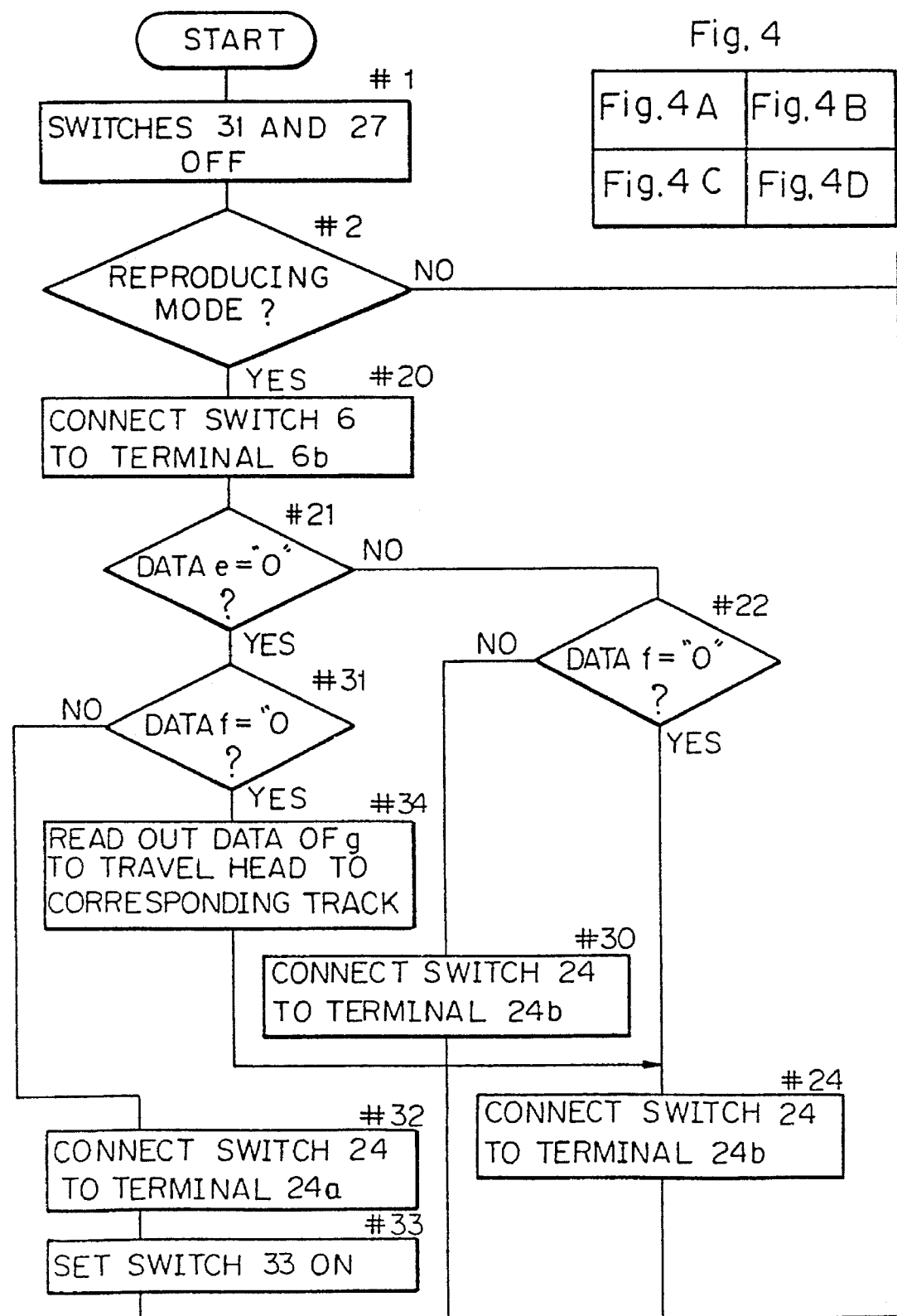
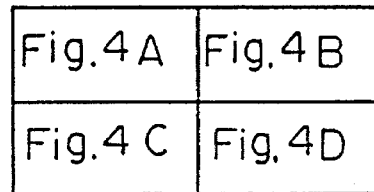

RECORDING/REPRODUCING APPARATUS WHERE THE VIDEO SIGNAL INDICATES THE LOCATION OF A RANDOMLY RECORDED CORRESPONDENCE AUDIO SIGNAL

This application is a continuation of prior application, Ser. No. 08/136,407 filed Oct. 15, 1993, which application is a continuation of prior application, Ser. No. 07/631,187 filed Dec. 20, 1990, which application is a continuation of prior application, Ser. No. 07/282,905 filed Dec. 12, 1988, which application is a continuation of prior application, Ser. No. 06/836,633 filed Mar. 5, 1986.

BACKGROUND OF THE INVENTION

1. Field of the Invent ion

This invention relates to an image and audio signals recording and/or reproducing apparatus for recording video and audio signals of finite length corresponding to each other on a recording medium such as a magnetic sheet or the like and/or reproducing the video and audio signals from the recording medium.

2. Related Background Art

An image and audio signals recording and/or reproducing apparatus according to the prior art is designed to record a video signal such as a still picture and an audio signal corresponding to the video signal on a set of areas corresponding at one to one on a recording medium and reproduce this set of areas at a time during reproduction.

As shown in FIG. 1, such areas include, for example, spiral recording tracks or concentric recording tracks on a magnetic sheet, and there is available a magnetic sheet 1 divided into an outer peripheral side To and an inner peripheral side Ti as shown in FIG. 1 of the accompanying drawings. In such magnetic sheet, a video signal is recorded on a track Tol on the outer peripheral side To and an audio signal is recorded on a track Til on the inner peripheral side Ti which corresponds to the track Tol, and during reproduction, the video signal and the audio signal are reproduced at a time with the two tracks Tol and Til as a set.

However, in the above-described video and audio signals recording and/or reproducing apparatus according to the prior art, when an image without a voice or only a audio signal has been recorded, nothing is recorded on a recording area (track) corresponding to the recorded image or voice, and this has led to a problem that the area of the recording medium such as the magnetic sheet cannot be utilized effectively.

SUMMARY OF THE INVENTION

It is a first object of the present invention to solve above described problem.

It is a second object of the present invention to provide video and audio signal recording and/or reproducing apparatus in which even when an video signal without an audio signal or an audio signal without an video signal has been recorded on a recording medium, any area in which no recording is effected is not formed on the recording medium and thus the recording medium can be utilized effectively.

It is a third object of the present invention to provide a recording medium on which an audio signal and a video signal are recorded and said video signal is recorded with information indicative of the position at which the audio signal corresponding to the video signal is recorded.

It is a fourth object of the present invention to provide a device for controlling access means in accordance with whether the access means generates a video signal or reproduces an audio signal when a signal reproducing operation is effected by the access means from a recording medium on which the audio signal and the video signal are recorded.

BRIEF DESCRIPTION OF THE DRAWINGS

FIGS. 2A, 2B and 2C show a block diagram showing the construction of a recording and/or reproducing apparatus according to an embodiment of the present invention when they are arranged according to FIG. 2.

FIGS. 4A, 4B, 4C and 4D show a flow chart showing the flow executed by the sequence controller shown in FIG. 2 when they are arranged according to FIG. 4.

DESCRIPTION OF PREFERRED EMBODIMENT

An embodiment of the present invention will be described with reference to FIGS. 2 and 3 hereinafter.

Figure 2B:
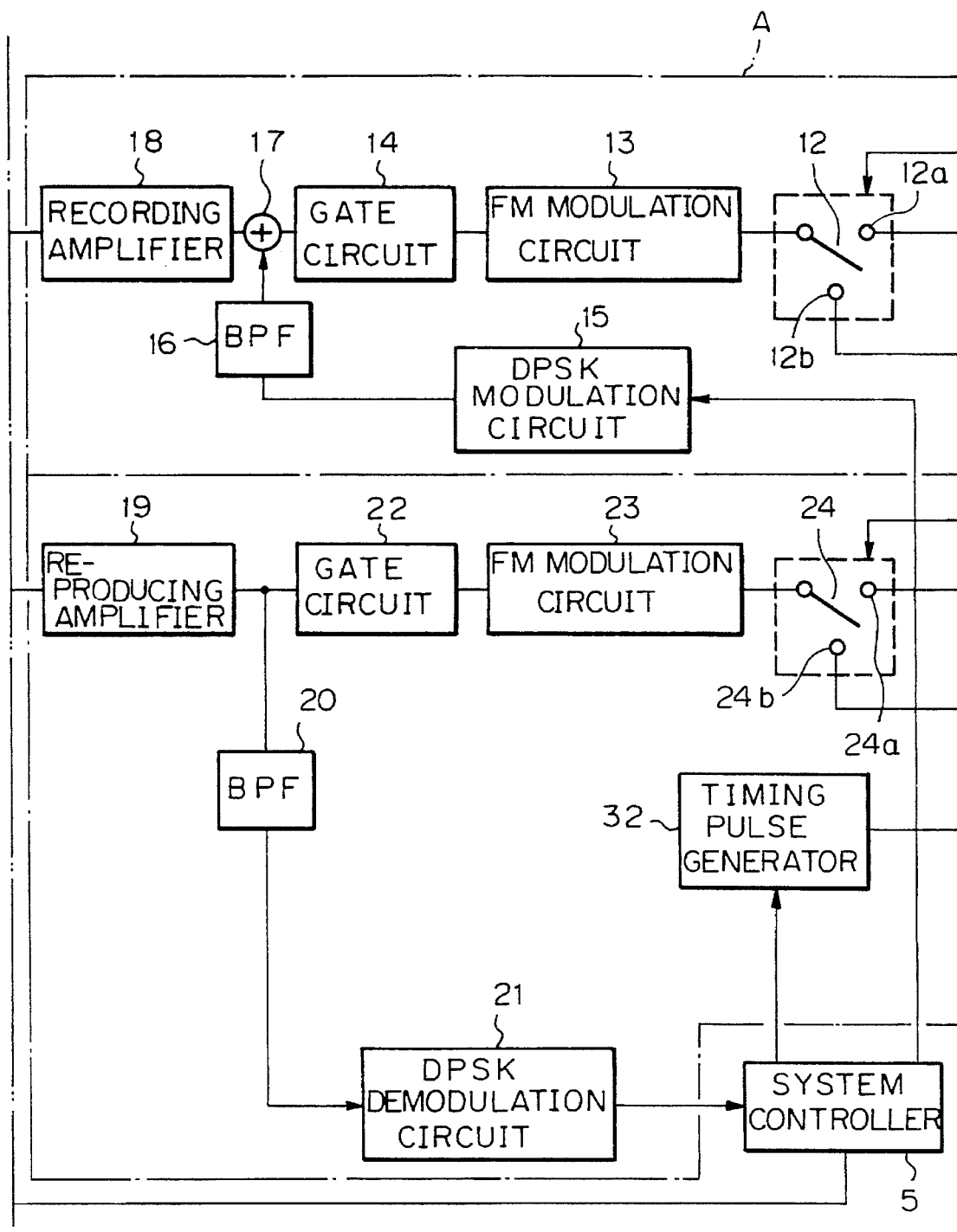
Figure 2C:
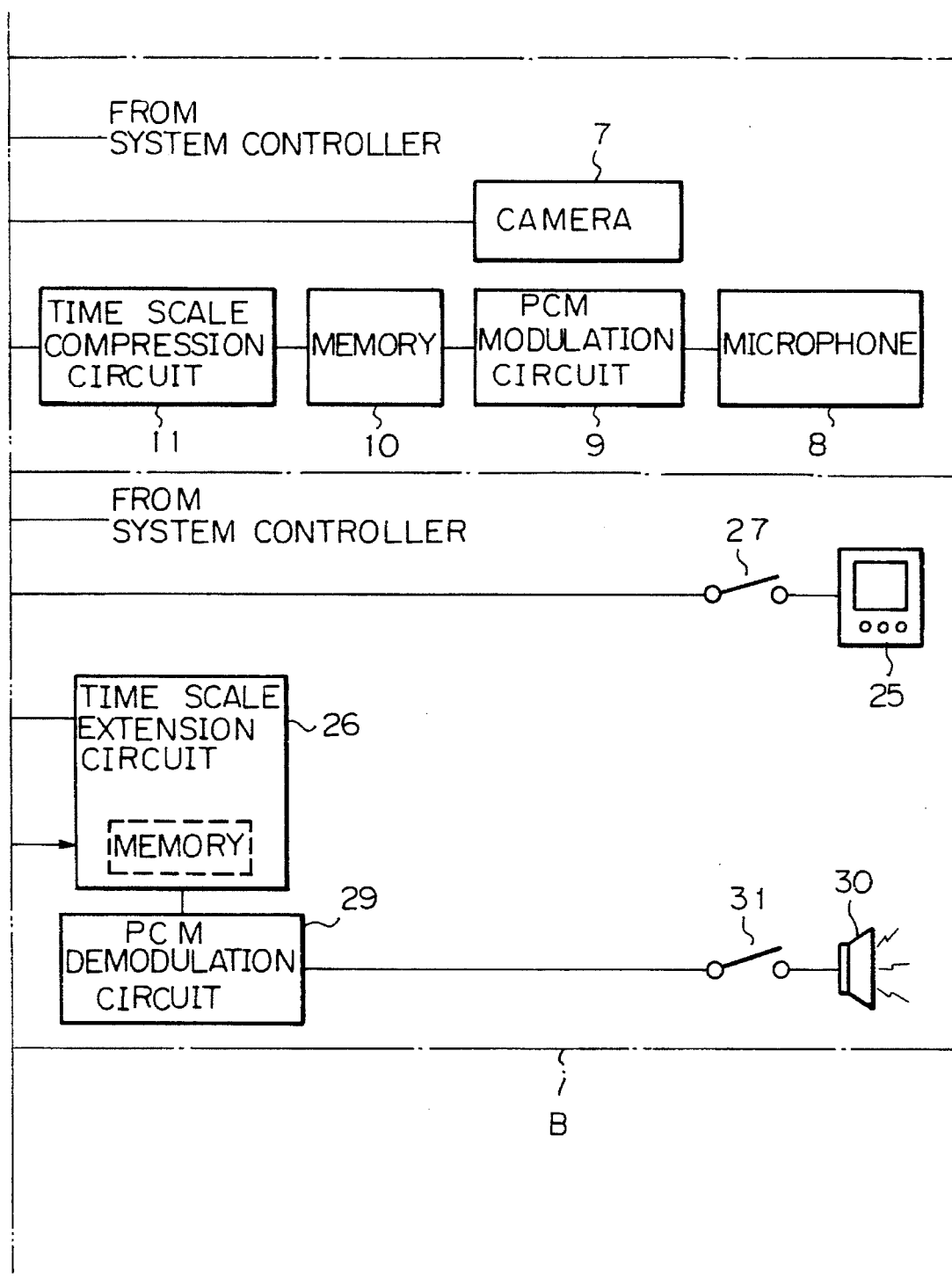

Referring to FIG. 2, a magnetic sheet 1 as a recording medium is provided with a video track TrV as a recording area and an audio track TrA corresponding to the video track. Reference numeral 2 designates a magnetic head for effecting recording and reproduction on the audio track TrA and the video track TrV, reference numeral 3 denotes a pulse motor for moving the magnetic head 2 radially of the magnetic sheet, reference numeral 4 designates a motor control circuit for controlling the driving of the pulse motor 3, and reference numeral 5 denotes a system controller for controlling the motor control circuit and circuits which will be described later. The recorded positions of the audio track TrA and the video track TrV on the magnetic sheet 1 are not limited to the shown positions, but may be random.

Reference numeral 6 designates a switch for selectively connecting the magnetic head 2 to the output of a recording system A and the input of a reproducing system B. The output of the recording system A is connected to the terminal 6a of the switch 6 and the input of the reproducing system B is connected to the terminal 6b of the switch 6. In the recording system A, reference numeral 7 designates a camera for converting an entering optical image into an electrical signal, reference numeral 8 denotes a microphone for delivering audio signals, reference numeral 9 designates a PCM modulation circuit for PCM-modulating the audio signals from the microphone 8, reference numeral 10 denotes a memory for accumulating therein the audio signals from the PCM modulation circuit 9, and reference numeral 11 designates a time scale compression circuit for time-scale-compressing the audio signals from the memory 10 when reading them out. Such compression circuit effects time scale compression by reading out the audio signals accumulated in the memory 10, at a high speed as compared with the speed of accumulation. Reference numeral 12 denotes a switch for selectively connecting the outputs of the camera 7 and the time scale compression circuit 11 to an FM modulation circuit 13. The camera 7 is connected to the terminal 12a of the switch 12 and the time scale compression circuit 11 is connected to the terminal 12b of the switch 12. Reference numeral 15 designates a DPSK (differential phase shift keying) modulation circuit for DPSK-modulating a data signal put out from the system controller 5 which will be described later, reference numeral 16 denotes a band-pass filter (BPF) connected to the rear stage of the DPSK modulation circuit 15, reference numeral 17 designates a frequency multiplexer for frequency-multiplexing a data signal delivered from the BPF 16 and audio and video signals delivered from the FM modulation circuit 13 through a gate circuit 14, and reference numeral 18 denotes a recording amplifier for amplifying the output from the frequency multiplexer 17. The gate circuit 14 is provided to effect recording on a track of the magnetic sheet 1.

In the reproducing system B, reference numeral 19 designates a reproducing amplifier for amplifying a reproducing signal passed through the switch 6, reference numeral 20 denotes a band-pass filter (BPF) connected to the rear stage of the amplifier 19, and reference numeral 21 designates a DPSK demodulation circuit for DPSK-demodulating a data signal delivered from the BPF 20. The data signal DPSK-demodulated by the DPSK demodulation circuit 21 is input to the system controller 5. Reference numeral 23 denotes an FM demodulation circuit for FM-demodulating a video signal input through the reproducing amplifier 19 and a gate circuit 22. The gate circuit 22 is provided to prevent the noise produced when the head 2 is shifted by the pulse motor 3 from being transmitted to the subsequent circuit. Reference numeral 24 designates a switch for selectively changing over the connections to a monitor 25 and a time scale extension circuit 26 relative to the output side of the FM demodulation circuit 23. A connecting switch 27 for connecting to the monitor 25 is connected to the terminal 24a of the switch 24, and the time scale extension circuit 26 is connected to the terminal 24b of the switch 24. The time scale extension circuit 26 has a memory for accumulating therein audio signals delivered from the connecting switch 27. Reference numeral 29 designates a PCM demodulation circuit for PCM-demodulating the audio signals read out from said memory, and reference numeral 30 denotes a speaker connected to the PCM demodulation circuit 29 through a connecting switch 31. The time scale extension circuit 26 writes the signal reproduced from the magnetic head 2 into the memory in the circuit 26 and reads out the signal written in conformity with a low speed pulse generated by a timing pulse generator 32 which will be described later, thereby effecting time scale extension. Reference numeral 32 designates a timing pulse generator for delivering to said memory a timing pulse for reading out the audio signal. The timing pulse generator 32 delivers the timing pulse when the start pulse from the system controller 5 is input thereto. The system controller 5 generates the start pulse in response to the data signal from the DPSK demodulator 21.

The switches 6, 12 and 24 change over their states in conformity with the output of the system controller 5. That is, the switch 6 changes over to the terminal 6a side during recording and to the terminal 6b side during reproduction, the switch 12 changes over to the terminal 12a side during video signal recording and to the terminal 12b side during audio signal recording, and the switch 24 changes over to the terminal 24b side when the audio signal is recorded in conformity with the data demodulated by the DPSK demodulation circuit 21, and to the terminal 24a side when the video signal is recorded. Such change-over is controlled by the system controller 5.

A data signal frequency-multiplexed with the video or audio signal will now be described with reference to FIG. 3.

Figure 1:
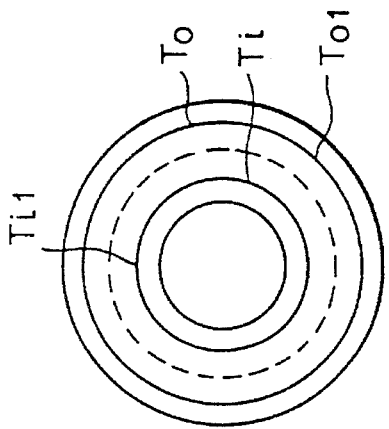
FIG. 1 is a plan view showing a combination of recording areas according to the prior art, and more particularly showing a magnetic sheet divided into an inner peripheral side and an outer peripheral side.
Figure 3:
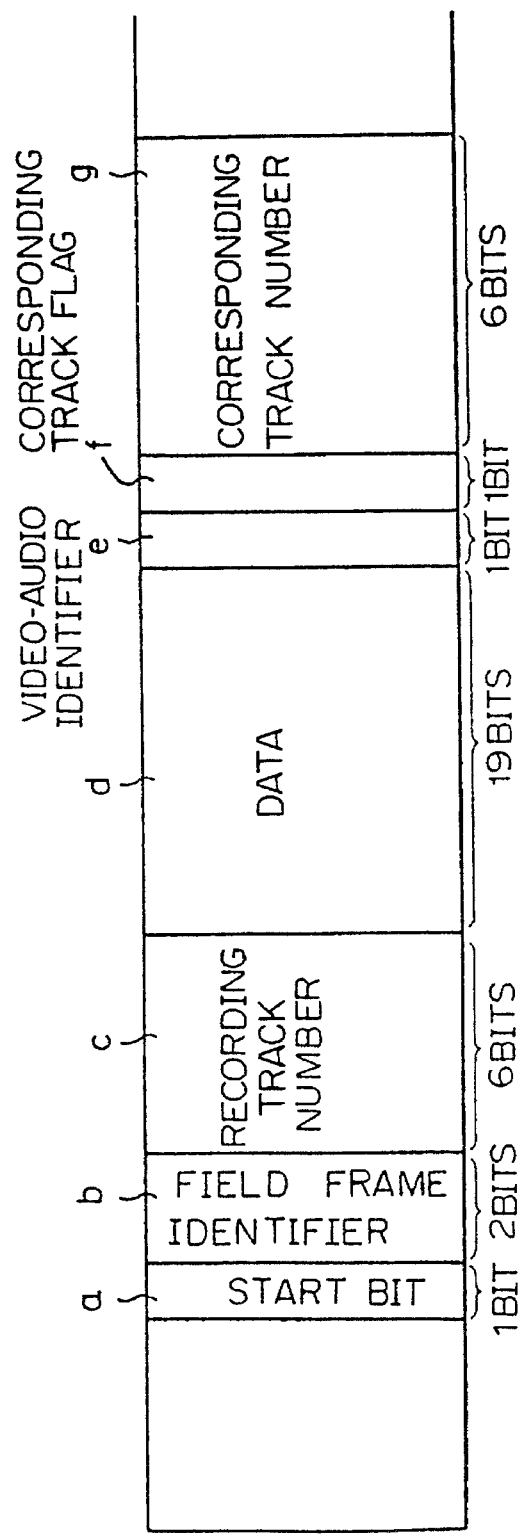
FIG. 3 shows the recording format of a data signal recorded or reproduced by the recording and/or reproducing apparatus shown in FIG. 2.

FIG. 3 shows an example of the recording format of the data signal frequency-multiplexed with the video or audio signal by the frequency multiplexer 17. The data signal is recorded at a predetermined position on the track, and the arrangement of data when the data signal is time-serially arranged as shown in FIG. 2. In FIG. 3, one bit-start bit of "1" or "0" is recorded on a. A two bits-signal representing whether the video signal is to be recorded at one field unit or at one frame unit is recorded on b. A six bits-signal representing the recording track number is recorded on c. A nineteen bits-signal representing the data is recorded on d. A one bit-signal representing whether the signal recorded on the track is a video signal or an audio signal is recorded on e. It is to be understood that "0" is recorded where the signal recorded is a video signal and "1" is recorded where the signal recorded is an audio signal. A signal representing whether there is present an audio signal or a video signal corresponding to the video or audio signal recorded on this track is recorded on f. It is to be understood that "0" is recorded when there is present a corresponding video or audio signal and "1" is recorded when there is not present a corresponding video or audio signal. A six bits-signal representing the track number on which the corresponding audio or video signal is recorded is recorded on g when "0" has been recorded on said f.

In the image and voice recording and/or reproducing apparatus having the above-described construction, when video and audio signals are to be recorded, the switches 6 and 12 are first connected to the terminals 6a and 12a, respectively. Thus, the video signal delivered from the camera 7 is FM-modulated by the FM modulation circuit 13, whereafter it is directed via the gate circuit 14 to the frequency multiplexer 17. Also, the audio signal delivered from the microphone 8 simultaneously therewith is PCM-modulated by the PCM modulation circuit 9, whereafter it is accumulated in the memory 10. On the other hand, the data signal delivered from the system controller 5 is DPSK-modulated and then input to the frequency multiplexer 17 through the BPF 16, and is frequency-multiplexed with the video signal delivered from the gate circuit 14. Thereafter, the frequency-multiplexed video and data signals are recorded on the track TrV1 of the magnetic sheet 1 by the magnetic head 2. When this recording operation is completed, a predetermined control signal is delivered from the system controller 5 to the motor control circuit 4, and on the basis of this control signal, the motor control circuit 4 drives the pulse motor 3 to move the magnetic head 2 to the track TrA1. Also, the audio signal accumulated in the memory 10 is time-scale-compressed by the time scale compression circuit 11 by the switch 12 being connected to the terminal 12b, whereafter it is directed to the frequency multiplexer 17 through the FM modulation circuit 13 and the gate circuit 14. This audio signal is frequency-multiplexed with the data information input from the system controller 5 through the DPSK modulator 15 and the BPF 16, by the frequency multiplexer 17, and is recorded on the track TrA1 of the magnetic sheet 1 by the magnetic head 2 through the recording amplifier 18. The data signal recorded on the track TrV1 by the above-described recording operation is "1" on e and "0" on f, for example, in FIG. 3, and the data signal recorded on the track TrV1 is "0" on e and "0" on f.

When only a video signal or only an audio signal is to be recorded, one of the above-described video and audio signal recording operations is carried out in a similar manner. But when the recording of only a video signal has been effected, the data signal is "0" on e and "1" on f. When the recording of only an audio signal has been effected, the data signal is "1" on e and "1" on f.

Description will Mow be made of a case where a video signal and an audio signal are reproduced at a time. The connecting switches 27 and 31 are disconnected and the switch 6 is changed over to the connection to the terminal 6b. Thus, the signal taken out from the track TrA1 of the magnetic sheet 1 by the magnetic head 2 is amplified by the reproducing amplifier 19, whereafter it is directed to the BPF 16 and a data signal is taken out. This data signal is alemodulated by the DPSK demodulation circuit 21, whereafter it is input to the system controller 5. The system controller 5 identifies by this data signal that the signal being delivered from the reproducing amplifier 19 is an audio signal and that there is present a corresponding video track, and connects the switch 24 to the terminal 24b. Thereby, the audio signal delivered from the reproducing amplifier 19 is accumulated in the memory in the time scale extension circuit 26. When the accumulation into such memory is completed, the switch 24 is changed over to the connection to the terminal 24a. Also, a control signal is delivered from the system controller 5 to the motor control circuit 4, and on the basis of this control signal, the motor control circuit 4 drives the pulse motor 3 to move the magnetic head 2 to the track TrV1 on which the video signal corresponding to the audio signal is recorded. When the movement of the magnetic head 2 terminates, the connecting switches 27 and 31 are connected and the video signal is delivered to the monitor 25 through the switch 27. Simultaneously therewith, a timing pulse is delivered from the timing pulse generator 32 to the time scale extension circuit 26 by a start command signal put out from the system controller 5, and in response to this timing pulse, an audio signal is read out from the memory in the extension circuit 26. This audio signal is PCM-demodulated by the PCM demodulation circuit 29, whereat tar it is directed to the speaker 30 through the connecting switch 31 and reproduced as a voice.

Where the data signal input to the system controller 5 is "0" on e shown in FIG. 3 and "0" on f, that is, where the magnetic head 2 is positioned at the video track TrV, a control signal is supplied from the system controller 5 to the motor control circuit 4 and the magnetic head 2 is moved to the corresponding audio track TrA by the pulse motor 3, whereafter a reproducing operation similar to what has been previously described is effected.

Also, where the data signal is "1" on e and "1" on f, that is, where an audio signal is recorded and a video signal corresponding thereto is not recorded, the switch 24 is connected to the terminal 24b and the connecting switch 31 is connected, and the aforedescribed audio signal reproducing operation is effected. During this audio signal reproducing operation, the video signal is not reproduced on the monitor 25. That is, the switch 27 is opened and the reproduction of the video signal is not effected.

Where the data signal is "0" on e and "1" on f, the switch 24 is connected to the terminal 24a and the connecting switch 27 is connected, and the video signal is reproduced from the monitor 25. During this video signal reproducing operation, no voice is put out from the speaker 30. That is, the switch 31 is opened and the reproduction of the audio signal is not effected.

Figure 4B:
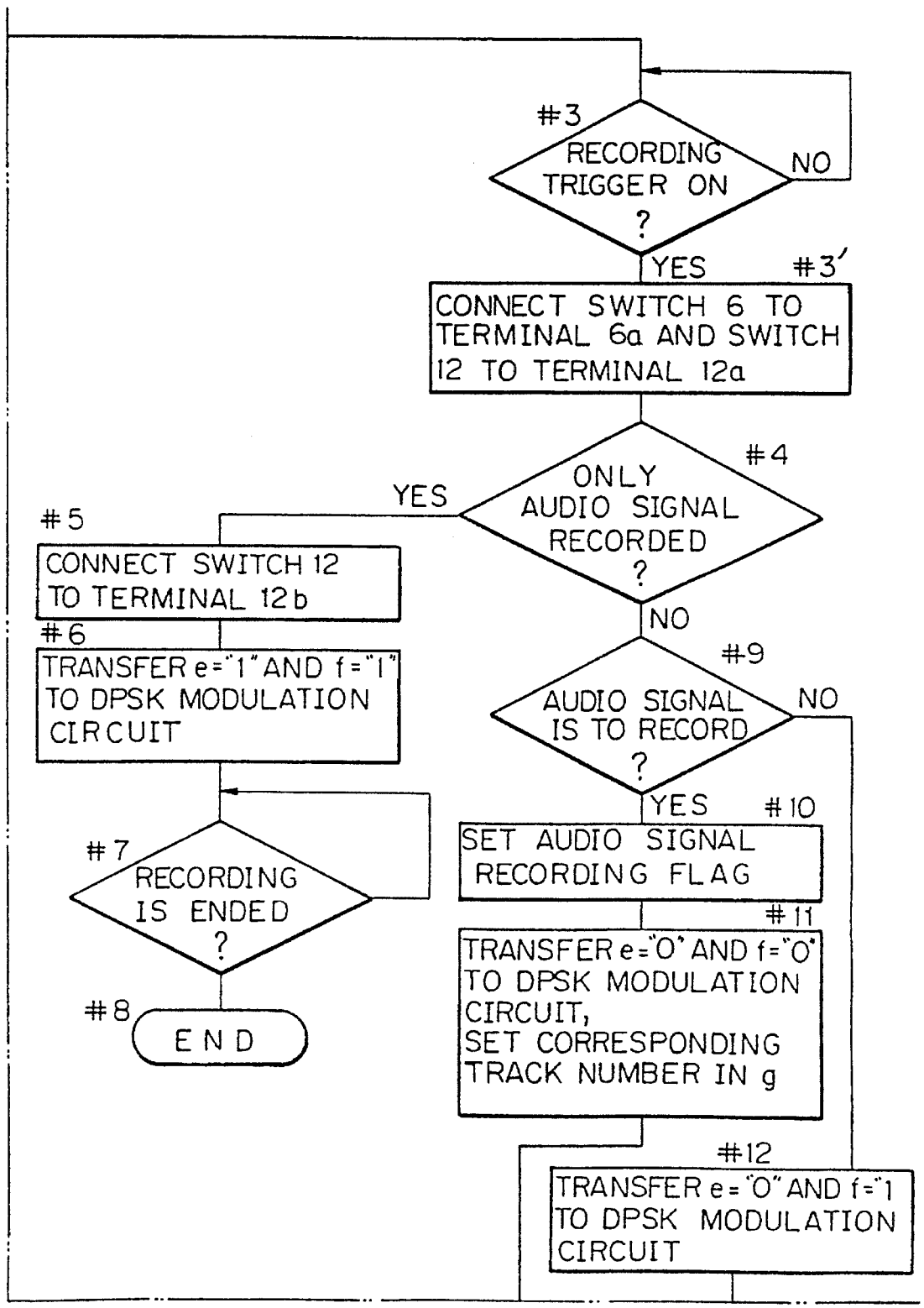
Figure 4C:
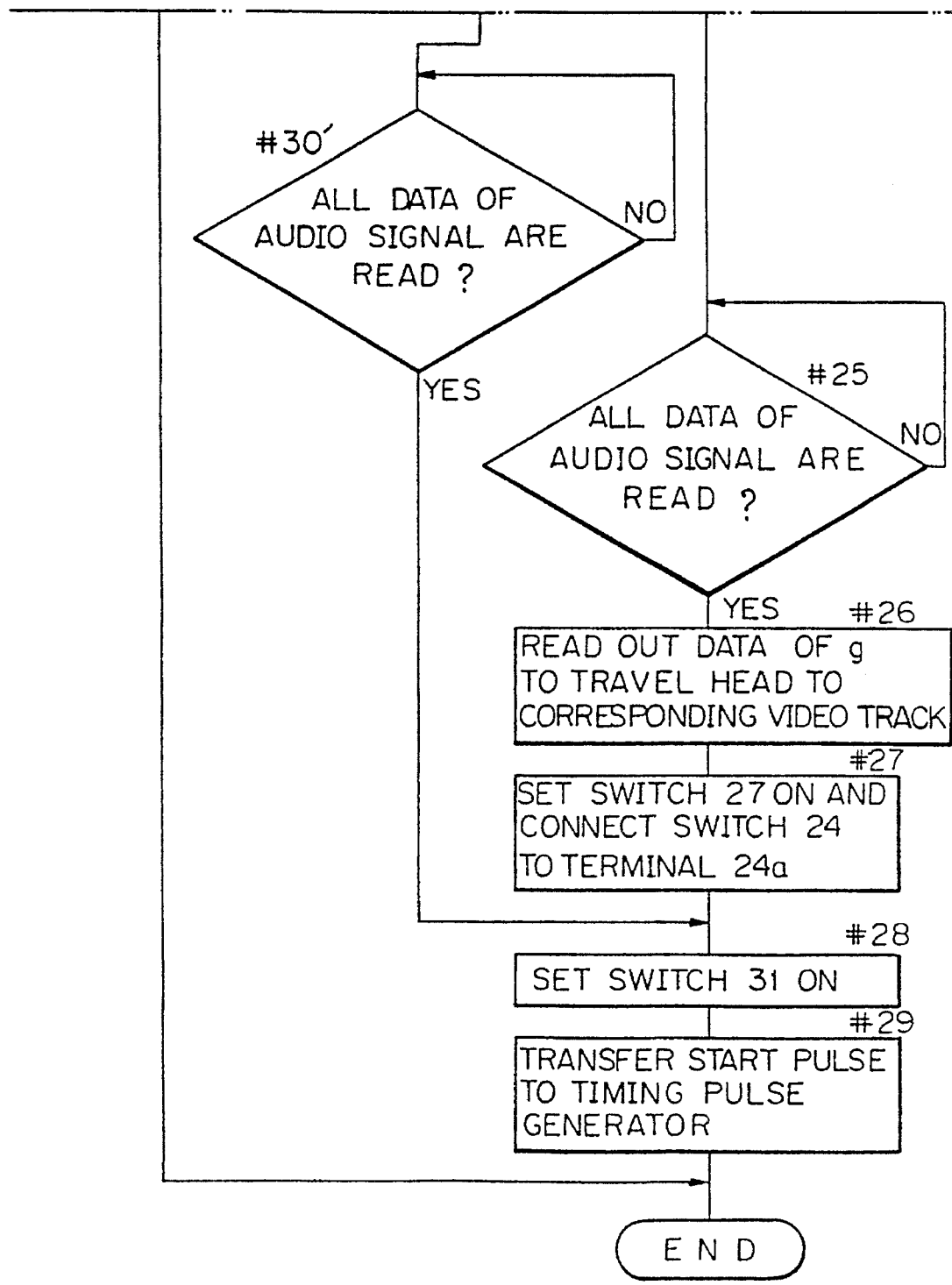
Figure 4D:
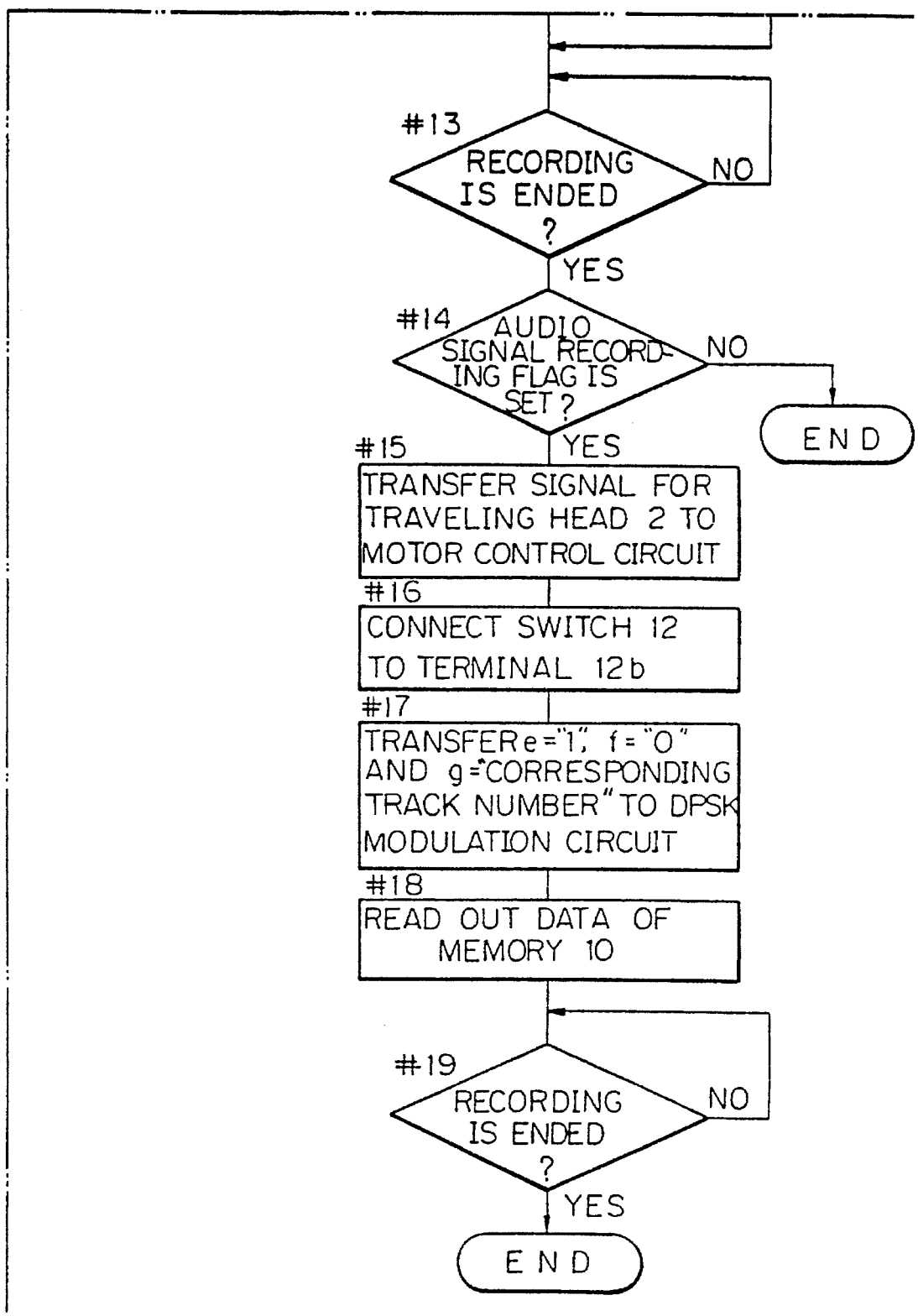

The flow chart of the sequence controller 5 for effecting the above-described operations will now be described with reference to FIG. 4.

When a power source circuit, not shown, is closed, the flow starts and the switches 31 and 27 are first opened and any noise is prevented from being produced from the monitor 25 and the speaker 30 (#1). Then, whether the reproducing mode is set by a mode setting switch, not shown, is discriminated and, if the reproducing mode is set, the flow branches off to #20, and if the recording mode is set, the flow branches off to #3. Here, description is made on the assumption that the recording mode is set. When the recording mode is set, whether a recording trigger switch, not shown, has been closed is discriminated at #3, and when the recording trigger switch has been closed, the flow proceeds to #3' and the switch 6 is connected to the terminal 6a side, whereby the recording amplifier 18 is connected to the head 2, and further the switch 12 is connected to the terminal 12a side, whereby the output of the camera 7 is input to the FM modulation circuit 13. Subsequently, it is decided whether the recording of only an audio signal is set, and if the recording of only an audio signal is set, the flow branches off to #5, and if the recording of only an audio signal is not set, the flow branches off to #9.

When the recording of only an audio signal is set, the switch 12 is connected to the terminal 12b side and the audio signal time-scale-compressed by the time scale compression circuit 11 is connected to the FM modulation circuit 13 (#5). Further, in order that "1" may be written into the areas e and f shown in FIG. 3, a data signal together with the signals of the other areas is transferred to the DPSK demodulation circuit 15 (#6). Then, whether recording is ended is discriminated (#7), and if recording is ended, the flow terminates.

When the recording of only an audio signal is not set, whether an audio signal is to be recorded is discriminated, and when an audio signal is to be recorded, the flow branches off to #10, and when an audio signal is not to be recorded, the flow branches off to #12 (#9). When the recording of an audio signal is set, that is, when the recording of an audio signal and a video signal is set, the audio signal recording flag is first set (#10), and then, in order that "0" may be written into the areas e and f shown in FIG. 3, a data signal together with the signals of the other areas is transferred to the DPSK modulation circuit 15 (#11). At #11, the track number on which the audio signal is to be recorded is also written into the area g.

When the recording of an audio signal is not set, the flow proceeds to #12 as previously described, and in order that "0" and "1" may be written into the areas e and f, respectively, shown in FIG. 3, a data signal together with the signals of the other areas is transferred to the DPSK modulation circuit 15(#12). At #3', the switch 6 was connected to the terminal 6a 10 side, whereby the video signal of the camera 7 is recorded by the head 2 through the FM modulation circuit 13, the gate circuit 14 and the recording amplifier 18.

Then, at #13, whether video signal recording is ended on a track is discriminated, and if the recording is ended, the flow proceeds to #14.

At #14, whether the audio signal recording flag is set is discriminated, and if the audio signal recording flag is set, the flow branches off to #15, and if the audio signal recording flag is not set, only the recording of a video signal is effected and the flow terminates.

If the audio signal recording flag is set, a signal is transferred to the motor control circuit 4 so that the head 2 accesses to the track of the track number written into the area g at #11, i.e., the vacant track discrete from the track on which the video signal has been recorded (#15). When the access of the head 2 terminates, the switch 12 is changed over to the terminal 12b side so that the audio signal is recorded(#16), and the audio signal memorized in the memory 10 is input to the FM modulation circuit 13.

When the audio signal memorized in the memory 10 begins to be input to the FM modulation circuit 13, in order that "1" and "0" may be written into the areas e and f, respectively, shown in FIG. 3 and the track number in which the corresponding video signal is written may be recorded on g, a data signal together with the signals of the other areas is input to the DPSK modulation circuit 15 (#17), and then the audio signal and the data signal are frequency-multiplexed by the frequency multiplexer 17 and recorded on the magnetic sheet 1 (#18), and when the audio signal recording is ended, the flow terminates.

Description will now be made of the flow executed when the reproducing mode is set at #2.

In such a case, the switch 6 is connected to the terminal 6b side and a reproducing signal is put out from the head 2 to the reproducing amplifier 19 (#20).

The data signal of the signal amplified by the reproducing amplifier 19 is input to the DPSK demodulation circuit 21 through the band-pass filter 20 and is demodulated thereby, whereafter it is input to the system controller 5. The system controller 5 detects whether "0" is written into the area e of the reproduced data signal, and if "0" is written into said area, the flow branches off to #31, and if "0" is not written into said area, the flow branches off to #22.

Where an audio signal is recorded on the track being accessed by the head 2, "1" is written into the area e and therefore, the flow branches off to #22, and whether "0" is written into the area f is discriminated, and if the corresponding video signal is recorded and "0" is written into the area f, the flow branches off to #24, and if the corresponding video signal is not recorded and "0" is not written into the area f, the flow branches off to #30.

Where the corresponding video signal is recorded, the switch 24 is changed over to the terminal 24b side (#24), and the audio signal reproduced by the head 2 is written into the memory in the time scale extension circuit 26. When all the reproduced audio signal has then been read, the flow proceeds from #25 to #26, and the area g of the data signal on the track on which the audio signal is recorded is read, whereby the track number on which the corresponding video signal is recorded is detected and the head 2 is moved to this track. The switch 24 is then changed over to the terminal 24a side and further, the switch 27 is closed so that the video signal recorded on the track being accessed by the head 2 is reproduced on the monitor 25 (#27), and further, the switch 31 is closed (#28), and then a start pulse is transferred to the timing pulse generator 32 (#29), and the audio signal memorized in the memory in the time scale extension circuit 26 is time-scale-extended so that it is reproduced from the speaker 30. Thus, the corresponding audio signal and video signal are reproduced at a time.

Also, if the video signal corresponding to the audio signal recorded on the track being accessed by the head 2 is not recorded and "0" is not recorded in the area f of the data signal, the switch 24 is changed over to the terminal 24b side (#30), and the audio signal is written into the memory in the time scale extension circuit 26 (#30'), and then the switch 31 is closed (#28) and the start pulse is transferred to the timing pulse generator 32 (#29), whereby the audio signal recorded on the magnetic sheet is reproduced.

Also, if the video signal is recorded on the track being accessed by the head 2 and "0" is recorded in the area e of the data signal, whether "0" is recorded in the area f of the data signal is discriminated (#31). If "0" is recorded in the area f, the area g of the data signal is read, whereby the track number on which the corresponding audio signal is recorded is detected and the head 2 is moved to this track (#34). The flow then proceeds to #24, and steps #24–#29 are executed, whereby as previously described, the corresponding audio signal and video signal are reproduced at a time, that is, the track on which the audio signal is recorded is first reproduced and the content thereof is memorized in the memory and then, when the track on which the video signal is recorded is reproduced, the audio signal memorized in the memory is reproduced from the speaker, whereby the audio and video signals are reproduced at a time.

If "0" is not recorded at #31, it means a case where the track on which the corresponding audio signal is recorded is not present and therefore, the switch 24 is changed over to the terminal 24a side (#32) and the switch 27 is closed(#33), whereby only the video signal is reproduced on the monitor 25, and further, since the switch 31 remains opened, the audio signal is not reproduced from the speaker 30.

Although a single magnetic head 2 is used in the above-described embodiment, the present invention is not restricted to such embodiment, but is also applicable to a case where provision is made of a plurality of magnetic heads, for example, a magnetic head exclusively for audio signals and a magnetic head exclusively for video signals.

It is also possible that in a system wherein only an audio signal is not singly recorded, the video signal track is first traced and the corresponding audio signal track number is multiplexed with the video signal and the corresponding video signal track is not multiplexed with the audio signal. Further, it is likewise possible that in a system wherein only a video signal is not singly recorded, the corresponding audio signal track number is not multiplexed with the video signal.

As described above, according to the video and audio signal recording apparatus of the present invention, even if a video signal of finite length and an audio signal corresponding to the video signal are recorded on any recording area of a recording medium, the video signal and the audio signal corresponding to each other can be taken out at a time when they have been reproduced and therefore, even in a case where an image without a voice or a voice without an image is recorded as in the prior art, any area in which no recording is effected is not formed on the recording medium, and the recording medium can be utilized effectively.

What is claimed is:

1. A recording and/or reproducing method for effecting one of (i) recording an audio signal on a recording medium by causing the audio signal to correspond to a video signal, (ii) recording an audio signal on a recording medium by causing the audio signal not to correspond to a video signal and (iii) reproducing at least one of an audio signal and a video signal recorded on a recording medium, said method comprising the steps of:

indicating one of (i) recording of the audio signal on the recording medium by causing the audio signal to correspond to the video signal and (ii) recording of the audio signal on the recording medium by causing the audio signal not to correspond to the video signal;

recording first data indicating that the video signal corresponding to the audio signal exists on the recording medium together with the audio signal, when said indicating step indicates that the audio signal is recorded on the recording medium corresponding to the video signal; and recording second data indicating that the video signal corresponding to the audio signal does not exist on the recording medium together with the audio signal, when said indicating step indicates that the audio signal is recorded on the recording medium not corresponding to the video signal.

2. A method according to claim 1, wherein the recording medium is a disk-shaped recording medium having a plurality of recording tracks.

3. A method according to claim 2, wherein said first data recording step further comprises recording third data indicative of a recording position for recording the video signal corresponding to the audio signal on the disk-shaped recording medium together with the audio signal and the first data, when said indicating step indicates that the audio signal is recorded on the disk-shaped recording medium corresponding to the video signal.

4. A method according to claim 1, wherein said first data recording step further comprises recording third data indicative of a recording position for recording the video signal corresponding to the audio signal on the recording medium together with the audio signal and the first data, when said indicating step indicates that the audio signal is recorded on the recording medium, corresponding to the video signal.

* * * * *

UNITED STATES PATENT AND TRADEMARK OFFICE
CERTIFICATE OF CORRECTION

PATENT NO. : 5,475,499  
DATED : December 12, 1995  
INVENTOR(S) : TOMISHIGE TAGUCHI Page 1 of 2

It is certified that error appears in the above-indentified patent and that said Letters Patent is hereby corrected as shown below:

COLUMN 1:

Line 13, "Mar. 5, 1986." should read --Mar. 5, 1986, all now abandoned.--;

Line 17, "Invent ion" should read --Invention--;

Line 44, "a audio" should read --an audio--;

Line 53, "solve above" should read --solve the above--;

Line 57, "an video" should read --a video--; and

Line 58, "an video" should read --a video--.

COLUMN 4:

Line 7, "as" should read --is as--; and

Line 12, "d-" should read --d.--.

UNITED STATES PATENT AND TRADEMARK OFFICE
CERTIFICATE OF CORRECTION

PATENT NO. : 5,475,499
DATED : December 12, 1995
INVENTOR(S) : TOMISHIGE TAGUCHI It is certified that error appears in the above-indentified patent and that said Letters Patent is hereby corrected as shown below:

COLUMN 5:

Line 3, "Mow" should read --now--; and

Line 11, "alemodulated" should read --demodulated--.

COLUMN 6:

Line 49, "10" should be deleted.

COLUMN 10:

Line 11, "medium," should read --medium--.

Signed and Sealed this

Eighteenth Day of June, 1996

Attest:

BRUCE LEHMAN

*Attesting Officer*        *Commissioner of Patents and Trademarks*